(No Model.)
O. P. HIX.
COUPLING FOR HOSE OR PIPE.
No. 410,417. Patented Sept. 3, 1889.
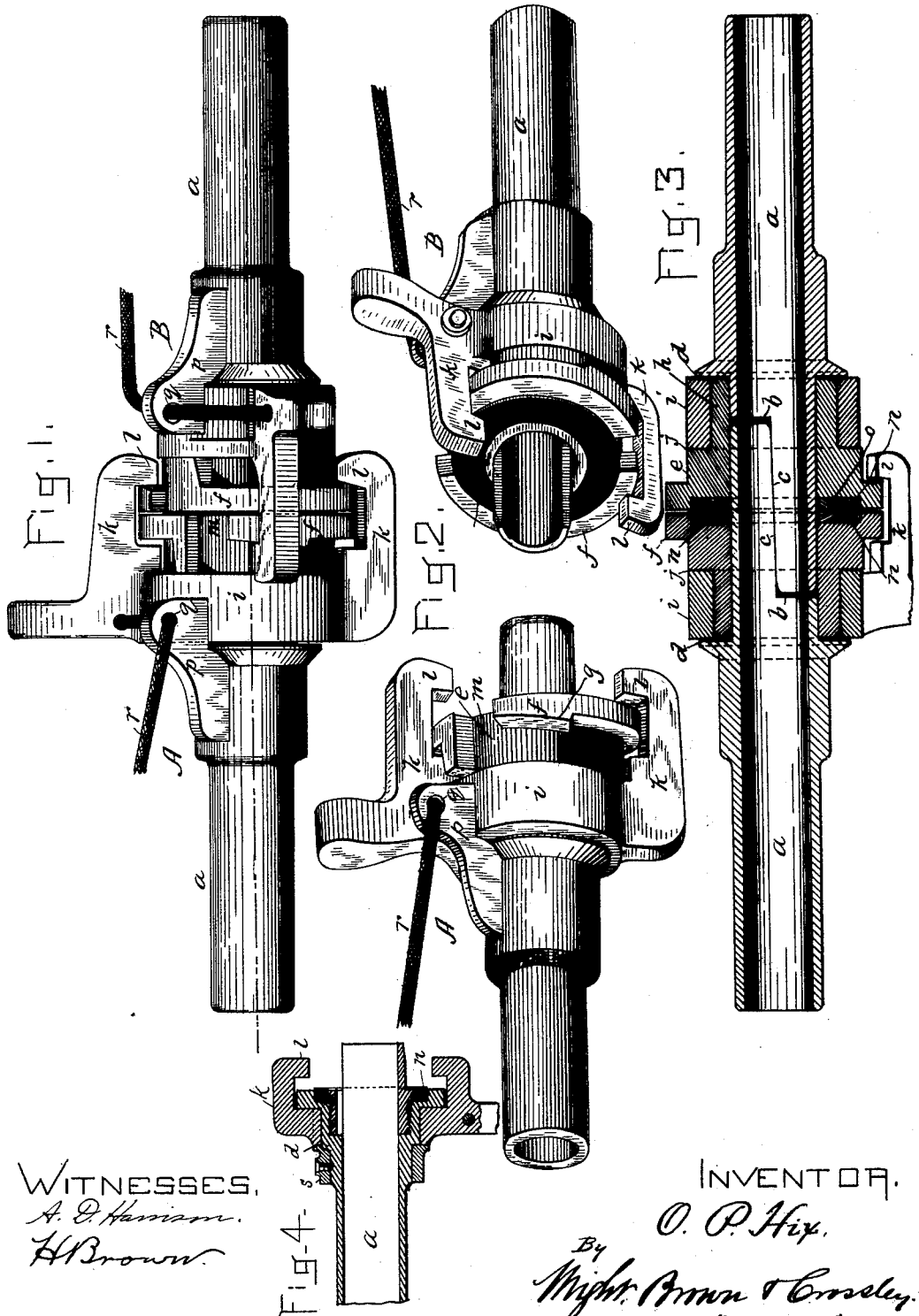
WITNESSES.
A. D. Harrison.
H. Brown.
INVENTOR.
O. P. Hix.
By
Wright, Brown & Crosley.
His Attys.

UNITED STATES PATENT OFFICE.

OLIVER P. HIX, OF ROCKLAND, MAINE.

COUPLING FOR HOSE OR PIPE.

SPECIFICATION forming part of Letters Patent No. 410,417, dated September 3, 1889.

Application filed November 12, 1888. Serial No. 290,563. (No model.)

*To all whom it may concern:*

Be it known that I, OLIVER P. HIX, of Rockland, in the county of Knox and State of Maine, have invented certain new and useful Improvements in Couplings for Hose or Pipes, of which the following is a specification.

It is the object of my invention to provide such improvements in pipe or hose coupling, particularly such pipes or hose as are used for conducting steam or heat, as will insure a close joint and protect the gasket from the direct action of the steam or heat.

To enable others skilled in the art to make and use my invention, I will now proceed to describe the same in detail, reference being had to the accompanying drawings and the letters of reference marked thereon, forming a part of this specification, of which drawings—

Figure 1 represents a side elevation of the invention, the two members being shown as locked together or coupled. Fig. 2 is a perspective view of the two members separated or uncoupled. Fig. 3 is a longitudinal sectional view taken on the line 3 3 of Fig. 1. Fig. 4 is a sectional view of a modified form of the invention.

Similar letters of reference designate similar parts and features in all of the views.

$a$ $a$ designate the pipes of the two members A B, each of which at its meeting end is cut away, as at $b$, so that when the two ends are brought together they will overlap and match or register, thus forming a continuous unbroken pipe or tube, as will be understood by reference to Fig. 3. The faces $c$ $c$ of the cut-away portions of the pipes are slightly wedge-shaped in form, for a purpose to be presently explained.

$d$ designates a shoulder or collar formed on each pipe $a$ by enlarging the circumference of the pipe or by shrinking a ring or collar thereon, or in any other suitable manner, against which shoulder the inner end of a collar or ferrule $e$ is made to abut, which collar $e$ may be shrunk upon or otherwise secured to the pipe $a$. The said collar $e$ is provided on its forward end with a flange $f$, the rearward side of which flange is provided with cams or inclines $g$. At its rearward or inner end the collar $e$ is turned down, as at $h$, to provide a bearing for the locking-ring $i$, which turns upon the said turned-down portion $h$ of the collar $e$, between the shoulder $d$ on the pipe $a$ and the offset or shoulder $j$, formed by turning down the collar $e$, as aforesaid.

The ring $i$ of each part or member is provided with arms $k$, which extend out over the flanges of the collar $e$, and are provided on their ends with inwardly-extending lugs or dogs $l$, which latter feature or parts, as the two members are brought together, are adapted to pass through notches or ways $m$, formed in the flanges $f$, and, as the rings are turned, to pass behind said flanges and against the incline faces or cams $g$, and so lock the two members together, as shown in Fig. 1, it being understood that the dogs $l$ of the member A co-operate with the flange $f$ and cams $g$ of member B, and vice versa. The collar $e$ is countersunk in its outer or abutting face, as shown, in the outer part of which countersink is arranged a gasket or packing-ring $n$, of rubber or other suitable material, a ring or bushing $o$ being arranged on the pipe $a$, and occupying the inner portion of the countersink formed in the outer face of collar $e$, so as to be intermediate of the pipe $a$ and gasket $n$.

With this construction, when the two members A B are brought together, so that the cut-away portions of the pipes $a$ will overlap and register or match, as aforesaid, the cut-away portion of each pipe will enter the collar $e$ of the opposite member, and the two inclined faces $c$, riding upon each other, will bind or wedge such faces together, so as to form a tight joint therebetween, and the two gaskets $n$ coming together will form a tight connection between the two abutting faces of the members, in which position they may be locked by turning the rings $i$, so that the dogs $l$ of one member will engage the inclines or cams $g$, formed on the flanges $f$ of collars $e$ of the other member.

It is to be observed that the locking devices are operative independent of the pipes themselves, as distinguished from contrivances where a portion of the pipe or the member proper constitutes the locking device, so that torsional strain on the pipes or members is not likely to uncouple or unlock the parts.

It is also to be observed that the locking device of each part is or may be operated independent of the other, and that each constitutes a complete lock for the two members without the other, so that if one by mischance be moved to unlocking position the other would still hold the two members together.

An important feature of the invention is the construction whereby a continuous metallic pipe is formed at the coupling-point and the gasket is protected against the direct action of the steam or heat, said gasket being outside of and beyond the circumference of the pipe proper.

Lugs $p$ may be formed on the pipes, through holes $q$ in which cords $r$ may be passed and connected at one end with the locking-rings $i$, the other ends of said cords being attached to the cars of the train, (when the invention is used to couple hose or pipe between cars of a train,) so that if two cars should by accident become uncoupled the strain on the cords $r$ would turn the rings $i$ to uncoupling position, and so uncouple the pipe or hose.

It is obvious that changes may be made in the form and arrangement of parts comprising my invention without departing from the nature or spirit thereof. For example, having reference to Fig. 4, the shoulder $d$ may be formed by securing a ring or collar $s$ to the pipe $a$, and instead of making the ferrule $e$ as a part separate from pipe $a$ it may be made integral therewith. Again, the overlapping ends of the pipes $a$ may be made as separate parts, and be secured to said pipes or the ferrules $e$, and be so formed as to have a part thereof serve as the ring or washer $o$, interposed between the pipe and the gasket $n$.

Having now particularly described and ascertained the nature of my said invention and in what manner the same is to be performed, I declare that what I claim is—

1. The herein-described improvement in pipe or hose couplings, comprising the two members having inclined or wedge-shaped meeting ends, the collars secured on said members at their ends, the gaskets or packing-rings, the rings or bushings for securing said gaskets to said collars, and the locking devices connected to each of said members, and constructed and arranged to engage and become locked with the other member, substantially as set forth, said locking devices being each operative independent of the member to which connected, as stated.

2. The herein-described improvement in pipe or hose couplings, comprising the members having overlapping wedge-shaped ends, and provided with shoulders or collars, the collars $e$, bearing against said shoulders or collars, the gaskets secured to the ends of said collars $e$, the rings $i$, having the projecting arms engaging said collars $e$, the apertured lugs formed on the pipe, and the cords connected to said arms, substantially as set forth.

In testimony whereof I have signed my name to this specification, in the presence of two subscribing witnesses, this 26th day of October, A. D. 1888.

OLIVER P. HIX.

Witnesses:
ARTHUR W. CROSSLEY,
A. D. HARRISON.